(12) United States Patent
Blossey et al.

(10) Patent No.: US 8,142,536 B2
(45) Date of Patent: Mar. 27, 2012

(54) FILTER UNIT

(75) Inventors: Werner Blossey, Benningen (DE); Lorenz Eilert, Braunschweig (DE)

(73) Assignee: Mann + Hummel GmbH, Ludwigsburg (DE)

( * ) Notice: Subject to any disclaimer, the term of this patent is extended or adjusted under 35 U.S.C. 154(b) by 648 days.

(21) Appl. No.: 12/301,937

(22) PCT Filed: May 18, 2007

(86) PCT No.: PCT/EP2007/054809
§ 371 (c)(1),
(2), (4) Date: Nov. 24, 2008

(87) PCT Pub. No.: WO2007/137949
PCT Pub. Date: Dec. 6, 2007

(65) Prior Publication Data
US 2011/0138761 A1   Jun. 16, 2011

(30) Foreign Application Priority Data
May 29, 2006 (DE) .......................... 10 2006 025 237

(51) Int. Cl.
*B01D 46/00* (2006.01)
(52) U.S. Cl. ................ 55/493; 55/490; 55/498; 55/502; 55/503; 55/521; 55/510
(58) Field of Classification Search .................... 55/490, 55/493, 498, 502, 503, 521, 510
See application file for complete search history.

(56) References Cited

U.S. PATENT DOCUMENTS

| | | | |
|---|---|---|---|
| 6,007,169 A * | 12/1999 | Li et al. | 312/223.2 |
| 7,604,128 B2 * | 10/2009 | Dworatzek et al. | 210/455 |
| 7,655,074 B2 * | 2/2010 | Nepsund et al. | 95/273 |
| 2004/0020177 A1 | 2/2004 | Ota et al. | |
| 2004/0173097 A1 | 9/2004 | Engelland et al. | |
| 2006/0081528 A1 * | 4/2006 | Oelpke et al. | 210/493.1 |
| 2007/0175187 A1 * | 8/2007 | Kopec et al. | 55/385.3 |
| 2008/0022641 A1 * | 1/2008 | Engelland et al. | 55/521 |
| 2008/0115758 A1 * | 5/2008 | Engelland et al. | 123/198 E |
| 2008/0250763 A1 * | 10/2008 | Widerski et al. | 55/357 |
| 2011/0000458 A1 * | 1/2011 | Muenkel | 123/198 E |

FOREIGN PATENT DOCUMENTS

| | | |
|---|---|---|
| EP | 0391019 | 10/1990 |
| WO | WO2005/046841 | 5/2005 |
| WO | WO2005/079954 | 9/2005 |
| WO | WO2006/009766 | 1/2006 |

* cited by examiner

*Primary Examiner* — Jason M Greene
*Assistant Examiner* — Dung H Bui
(74) *Attorney, Agent, or Firm* — James Hasselbeck

(57) ABSTRACT

A filter unit includes at least one housing and at least one filter element designed for axial flow between its end faces that is inserted with at least a portion of its length into a tubular filter protection element and connected thereto and provided about its circumference with at least one endless sealing collar that is supported on the filter protection element and by clamping means is pressed against a sealing flange provided on the housing.

12 Claims, 2 Drawing Sheets

FILTER UNIT

Figure 1:
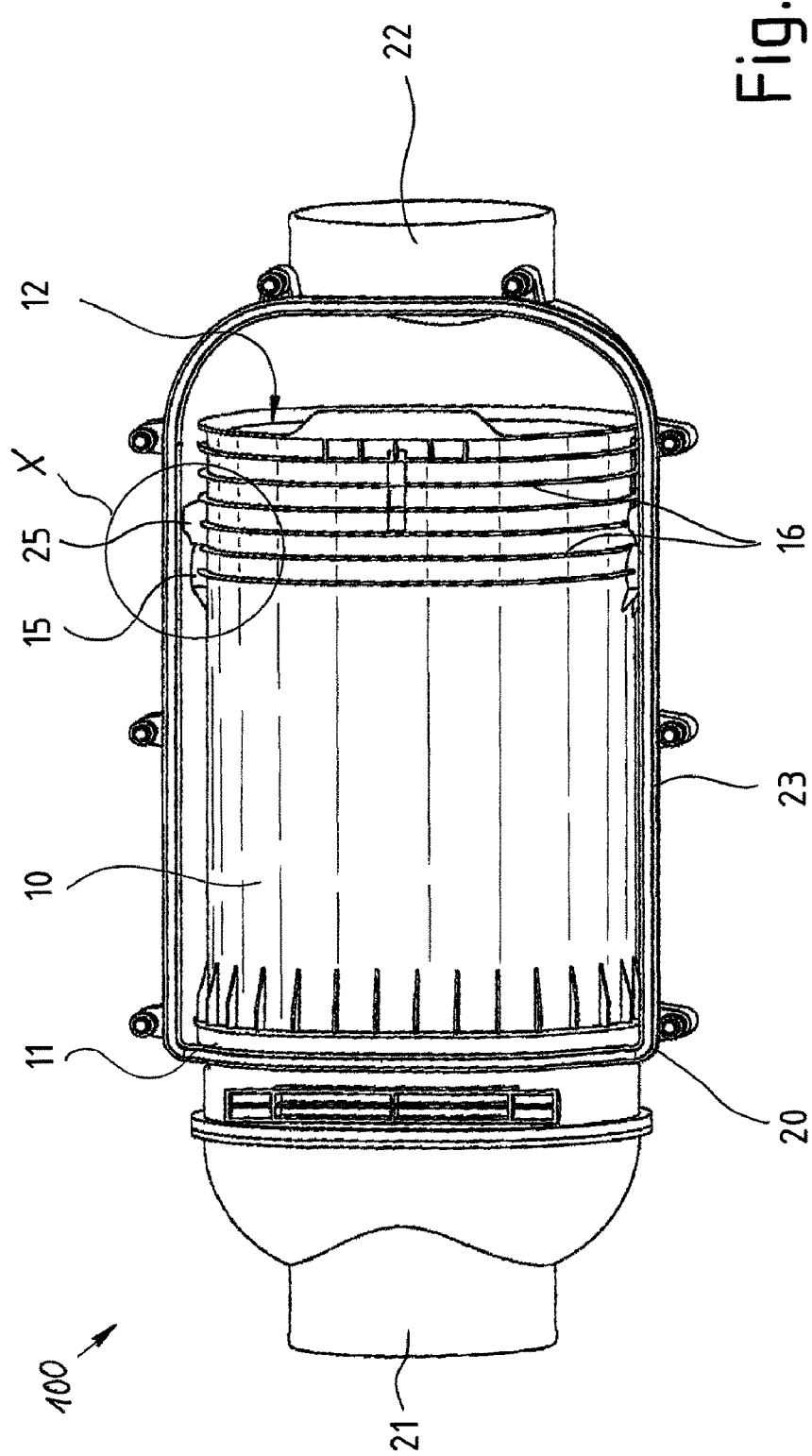

The invention concerns a filter unit comprising at least one housing and at least one filter element designed for axial flow between its end faces that is inserted with at least a portion of its length into a tubular filter protection element and connected thereto and provided about its circumference with at least one endless sealing collar that is supported on the filter protection element and by clamping means is pressed against a sealing flange provided on the housing.

DE 32 49 151 C2 discloses a compact air filter element. It is comprised of an undulated filter paper and a flat filter paper. The filter papers are glued together and then wound together to form a filter element of the desired size. In this connection, gluing is realized by a strip-shaped application in the edge area such that the interstices between the undulated and the flat layers are closed alternatingly at the two end faces so that no direct flow is possible through the channels between the filter papers. An air flow, when flowing from the unfiltered air side to the filtered air side, first reaches only a branch channel, then passes through the filter paper and flows out from a branch channel on the other side. In comparison to conventional folded filters, these compact air filters have the advantage that for the same size a larger filter surface area is provided or for the same filter surface area a smaller size is made possible. The wound filter core is designed such that flow of air is possible only through the filter paper.

In these and other compact air filter elements the flow passes axially from one end face to the other. For proper function it is important that the compact air filter element is hermetically sealed at its outer circumference relative to the air filter housing. For this purpose, a sealing collar is provided integrally about the circumference wherein the collar is to be placed against a corresponding contact shoulder of the air filter housing and is to be pressed against it.

It is also known to insert the compact air filter element into a filter protection element that has a collar that can press against the circumferentially formed seal. By actuating a lever the filter protection element is axially displaced relative to the air filter housing and pressed against the sealing ring. In this way, inserting and sealing of the compact air filter element are possible in a very simple way. However, when the actuation of the lever is forgotten, the filter is entirely without function because unfiltered air can pass the sealing collar and thus can flow past the outer circumference of the compact air filter element.

It is therefore an object of the invention to enforce a sealing action of the filter element relative to the housing.

By means of the guide, the filter protection element with the filter element arranged therein is moved upon insertion into the housing by a movement oriented transversely to the flow direction axially in relation to the center axis of the filter element and is simultaneously pressed with its sealing ring against a corresponding flange of the housing so that the sealing action is produced mandatorily. Once the filter element with attached filter protection element is inserted into the corresponding guide of the housing, the precise positioning and sealing action of the filter element are effected in a defined way. The same holds true in reverse for the second embodiment.

It is essential in connection with the invention that the filter protection element and the housing upon insertion carry out an axial relative movement. For this purpose, different positive-locking couplings such as, for example, groove-shaped guides and pins engaging therein are conceivable.

Preferably, the guide is embodied as an insertion ramp and the guide means on the filter protection element as a projection with a rounded gliding surface. Such a pair is easily producible and can be easily mounted. Moreover, it can be designed to be very robust.

An operating error could result only in so far as the filter element is not inserted far enough into its guide. In order to be able to eliminate even in this case the last error sources, preferably spacer elements are integrally formed on the outer circumference of the filter protection element and/or on the areas positioned opposite the filter protection element on the bottom side of the cover element in order to bridge completely a possibly present air gap between the filter protection element and the cover element. This has the result that for insufficient insertion of the filter element the housing cannot be closed by means of the cover element and this indicates an error to the operator; or that the filter element upon attachment of the cover element is brought automatically into the prescribed seal-tight end position.

Alternatively, the cover and the filter protection element can also be matched to one another such that for a properly mounted filter element an air gap is no longer present i.e., they contact one another. In this connection, when the air filter element and its filter protection element is not pressed far enough into the guide, the cover element can also not be closed or it effects automatically the insertion into the end position.

In the simplest case, the guide is embodied as an inclined plane. The gliding surface that is integrally formed on the outer circumference of the filter protection element, glides on the inclined plane until the desired end position has been reached. The fixation of the end position is then realized positive-lockingly by means of the housing cover.

Preferably, the guide is divided into at least two path sections with different incline or curvature. A first path section serves for pre-positioning the filter protection element together with the filter within the bottom part of the housing and effects the axial advancement. In the second path section an optimal contact of the gliding surfaces of the filter protection element against the corresponding receptacles in the guide of the housing is provided.

When, for example, the gliding surface is a circular arc, a compatible circular arc section is provided in the area of the guide.

Between the two path sections there is preferably a hump that in particular is provided with a slight undercut so that, when pushing in the filter element, a locking action is activated after passing the hump by means of which the filter element at least during mounting is secured safely in the provided position of use until the final fixation by means of the cover element can be realized.

The filter protection element has preferably such a length that it extends at least from a front end, where the support elements for the sealing collar that is provided circumferentially on the filter element are arranged, up to the clamping means. In this way, the axial advancing force that is effected by the clamping means can be transmitted by means of the wall of the filter protection element without acting by compression on the filter element itself.

The clamping means are preferably arranged on the end area that is facing away from the sealing collar and the filter protection element is designed to be of such a length that it can receive the filter element completely. Accordingly, in the area of the sealing collar and at the clamping means two supports are formed on which the filter protection element together with the filter is fixedly supported with both ends. Freely projecting areas, if even present, are so short that in this preferred embodiment of a filter unit the bending load is correspondingly minimal.

The filter unit according to the invention is employed in particular as an air filter unit for internal combustion engines. As a filter preferably compact air filters of the afore described kind are utilized.

Figure 2:
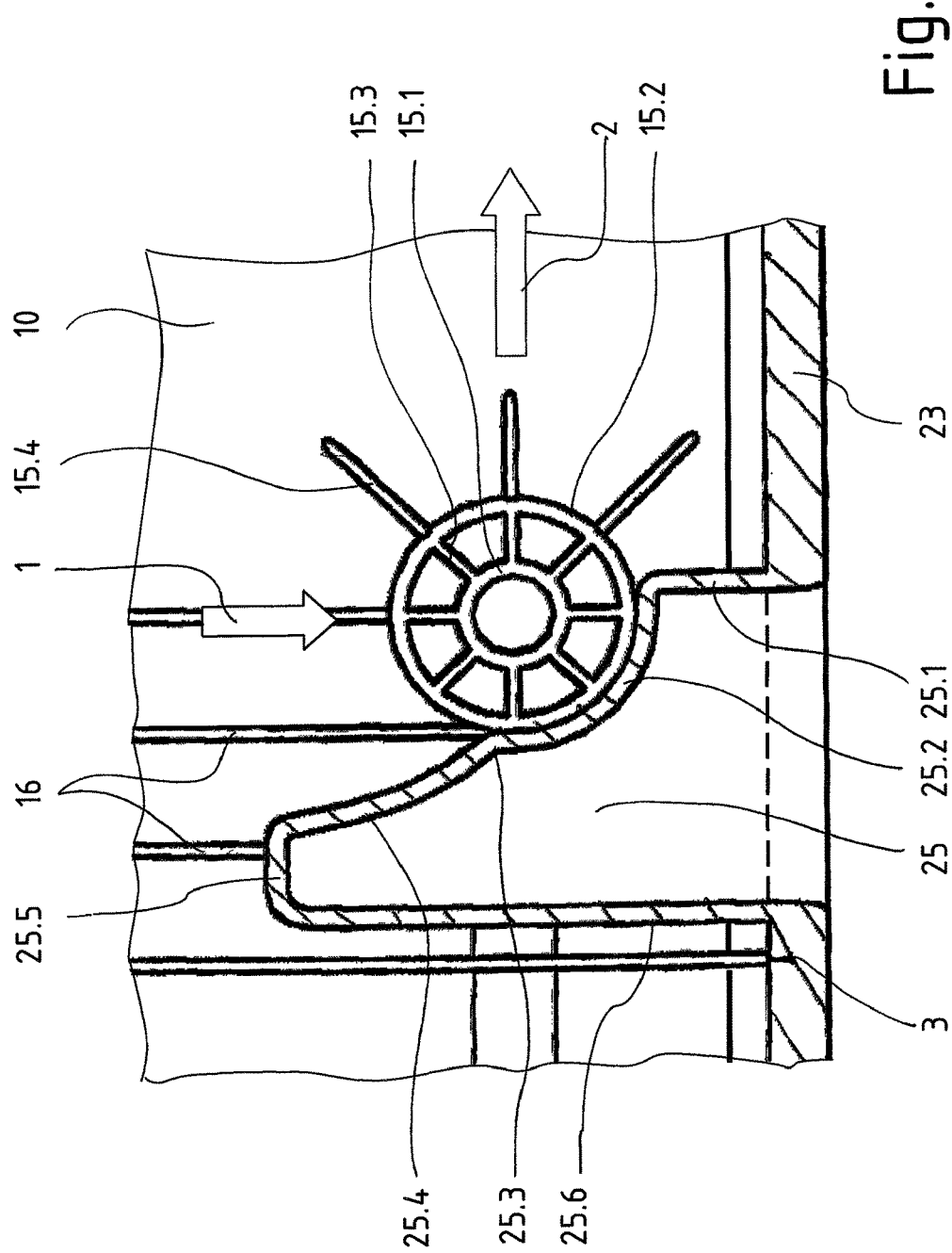

The invention will be explained in the following in more detail with reference to the drawing. The figures shows in detail:

FIG. 1 a view from above onto an open air filter unit; and
FIG. 2 the detail X of FIG. 1 in a side view.

FIG. 1 shows an air filter unit 100 with a housing 20 and a tubular filter protection element 10 positioned therein.

In FIG. 1, the cover of the housing 20 is removed so that it is possible to view the interior of the housing. The filter element itself is completely arranged within the filter protection element 10 and therefore cannot be seen in FIG. 1.

The filter protection element 10 has a front socket 11 that is designed for receiving a sealing collar that is integrally formed on the circumference of the filter element 10. The front socket 11 forms a support for the sealing collar so that upon axial advancement of the filter protection element 10 with the inserted filter element the sealing collar effects at the corresponding flange-like projection on the housing 20. From here, the housing tapers to the connecting socket 21.

On the opposite end the filter protection element 10 is also positioned with its end face 12 in front of a connecting socket 22.

Essential in connection with the invention is the arrangement of a projection 15 on the outer circumference of the filter protection elements 10 that is in engagement with an insertion ramp 25 formed integrally on a housing wall 23.

In the present embodiment, on two diametrically opposed positions of the filter protection element 10 or of the housing 20 a projection 15 or an insertion ramp 25 is arranged. In this way, canting of the filter protection element is prevented. This is in particular true when the filter protection element, as in the illustrated embodiment, has a cross-section in the form of a slotted hole and the clamping means are arranged oppositely on the arc-shaped narrow sides.

In order to reinforce the filter protection element in the end area between the two positions of the clamping means, several ribs 16 are provided.

A preferred embodiment of the projection 15 and of the corresponding insertion ramp 25 is illustrated in detail in FIG. 2. FIG. 2 corresponds to a view onto the detail X in FIG. 1.

The insertion ramp 25 is formed on the housing bottom 23. In order to enable the manufacture of the housing as an injection-molded plastic part, material aggregations must be avoided so that the insertion ramp 25 in the present embodiment is configured as a hollow body.

An insertion point is formed by an axial wall section 25.5 that is oriented parallel to the flow direction and thus to the desired advancing direction of the filter protection element 10 within the housing 20. It extends from the housing bottom 23 into the interior of the housing.

A first arc-shaped path section 25.4 follows. Its extension is selected such that it extends more in the direction of the coordinate that is parallel to the insertion direction 1 and less in the direction of the advancement 2, i.e., in the insertion direction 1 a large travel must be carried out in order to achieve in the direction of arrow 2 an advancement that is relatively small in comparison.

In the end position or mounted position of the filter protection element illustrated in FIG. 2 the projection 15 rests against a further curved path section 25.2. At the transition between the path sections 25.4 and 25.2, a hump 25.3 is formed that in particular has a slight undercut so that a fixed locking action of the filter protection element 10 in the housing 20 is effected when the projection 15 has passed the hump 25.3 and rests against the arc section 25.2.

A vertical section 25.1 serves for properly vertically positioning in the housing 20 the sections 25.2 to 25.4 that act as the actual guide.

In order to prevent the guide from bending away, the part of the insertion ramp 25 to the left in FIG. 2 is supported by a rearward section 25.6 on the housing bottom.

The projection 15 is comprised in the illustrated embodiment of two concentric circular ribs 15.1, 15.2 that are supported relative to one another by radial ribs 15.3. The outer circular rib 15.2 is supported by radial slanted ribs 15.4 on the surface of the filter protection element 10. Even though for the insertion and gliding movement only the area of the outer circular rib 15.2 shown down to the left in FIG. 2 is required as a gliding surface, the multiple support actions by the closed circular ribs 15.1, 15.2 and the radial ribs 15.3, 15.4 are advantageous in order to prevent shearing off of the projection 15 from the surface of the filter protection element 10. The projection 15 with its rounded gliding surface (concentric rib 15.2) may serve as a guide means interacting with the actual guide sections 25.2-25.4 of insertion ramp 25.

The reinforcement rib 16 shown all the way to the left in FIG. 2 is positioned in the mounted position at the point 3 directly on the housing bottom 23. In the same way, the rib 16 rests at the top against the cover element, not shown in this illustration. When the filter protection element 10 is not completely forced downwardly into the insertion ramp, the cover cannot be attached and the housing cannot be closed. When the operator then presses with great force onto the cover in order to cause the cover to close, this force is transmitted by means of rib 16 onto the filter protection element 10 and moves it into the prescribed end position. In this way, by means of the clamping means embodied in accordance with the invention the sealing action is also effected mandatorily.

The invention claimed is:

1. Filter unit (100), comprising
a housing including
   a first housing member (20) having an open sidewall not closed over by the first housing member;
at least one filter element designed for axial flow between its end faces, that with at least part of its length is inserted into a tubular filter protection element (10) and is connected thereto and that about its outer circumference has at least one endless sealing collar,
wherein the sealing collar is supported on the filter protection element (10) and can be pressed by means of clamping means against a sealing flange on the first housing member (20),
wherein the open sidewall is adapted for insertion of the filter element into the first housing member,
wherein the clamping means are formed by
   at least one insertion ramp (25) on the first housing member (20) and
   at least one projection (15) on the filter protection element (10) that is gliding along the insertion ramp,
wherein the insertion ramp (25) extends from an insertion point (25.5) located in an interior of the first housing member in a direction transverse to a flow direction towards a sidewall of the first housing member (23) and also in an axial direction toward the sealing flange on the housing (23).

2. Filter unit comprising
a housing including
- a first housing member (20) having an open sidewall not closed over by the first housing member;
at least one filter element designed for axial flow between its end faces, that with at least part of its length is inserted into a tubular filter protection element and is connected thereto and that about its outer circumference has at least one endless sealing collar,
wherein the sealing collar is supported on the filter protection element and can be pressed by means of clamping means against a sealing flange on the first housing member,
wherein the open sidewall is adapted for insertion of the filter element into the first housing member,
wherein the clamping means are formed by
- at least one insertion ramp on the filter protection element and
- at least one projection on the first housing member that is gliding along the insertion ramp,
wherein the insertion ramp (25) extends from an insertion point (25.5) located in an interior of the first housing member in a direction transverse to a flow direction towards a sidewall of the first housing member (23) and also in an axial direction toward the sealing flange on the housing (23).
wherein the insertion ramp extends from an insertion point located in an interior of the first housing member in a direction transverse to a flow direction towards a sidewall of the first housing member and also in an axial direction away from the sealing flange on the housing.

3. Filter unit (100) according to claim 1 or 2, wherein
a guide is formed by an insertion ramp (25) and
a guide means on the filter protection element (10) is formed as a projection (15) with a rounded gliding surface.

4. Filter unit (100) according to claim 3, wherein
the insertion ramp (25) is embodied as an inclined plane.

5. Filter unit (100) according to claim 3 wherein
the insertion ramp (25) is divided into at least two path sections (25.2, 25.4) comprising at least a first arc shaped path and a further curved path section with different incline or curvature.

6. Filter unit (100) according to claim 5, wherein
the path section (25.2) for a mounted position of the filter protection element (10) and a part of a gliding surface on the projection (15) resting in the mounted position against it are embodied as circular arc sections having same radius.

7. Filter unit (100) according to claim 5, wherein
a hump (25.3) is formed at a transition between the first arc shaped path and the further curved path section,
wherein an undercut is formed on the hump at the transition between the hump and the further curved path section,
wherein the undercut is operable to fixedly lock the at least one protection into the further curved path section when the projection has passed the hump and rests against the further curved path section,
wherein the undercut fixedly locking the at least one projection is operative, at least during mounting of the filter element, to safely secure the filter element into the first housing member until final fixation by means of the cover element is realized.

8. Filter unit (100) according to claim 1 or 2, wherein
in that on the outer circumference of the filter protection element (10) and/or on the areas of a cover element located opposite the filter protection element (10) spacer elements are integrally formed and the cover element contacts the filter protection element (10) in the operating state of the filter element.

9. Filter unit (100) according to claim 8, wherein the insertion ramp (25) is embodied as an inclined plane.

10. Filter unit (100) according to claim 8, wherein the insertion ramp (25) is divided into at least two path sections (25.2, 25.4) comprising at least a first arc shaped path and a further curved path section with different incline or curvature.

11. Filter unit (100) according to claim 10, wherein
the path section (25.2) for a mounted position of the filter protection element (10) and a part of a gliding surface on the projection (15) resting in the mounted position against it are embodied as circular arc sections having same radius.

12. Filter unit (100) according to claim 10, wherein
a hump (25.3) is formed at a transition between the first arc shaped path and the further curved path section,
wherein an undercut is formed on the hump at the transition between the hump and the further curved path section,
wherein the undercut is operable to fixedly lock the at least one projection into the further curved path section when the projection has passed the hump and rests against the further curved path section,
wherein the undercut fixedly locking the at least one projection is operative, at least during mounting of the filter element, to safely secure the filter element into the first housing member until final fixation by means of the cover element is realized.

* * * * *